Oct. 5, 1954    J. A. BLAIS    2,691,089
HOT-WATER BOTTLE HEAT STABILIZER
Filed Sept. 4, 1952    2 Sheets-Sheet 1
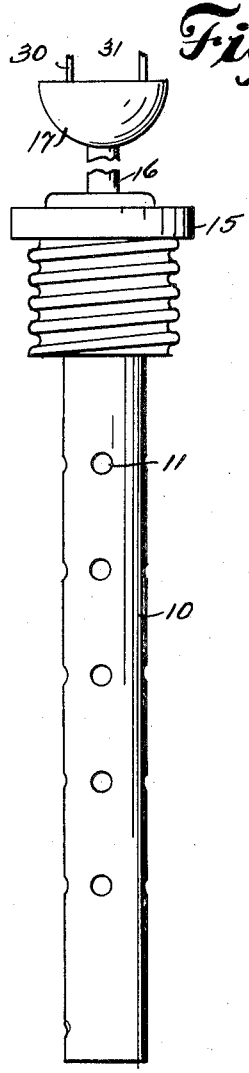
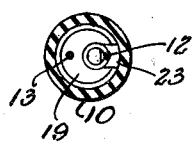
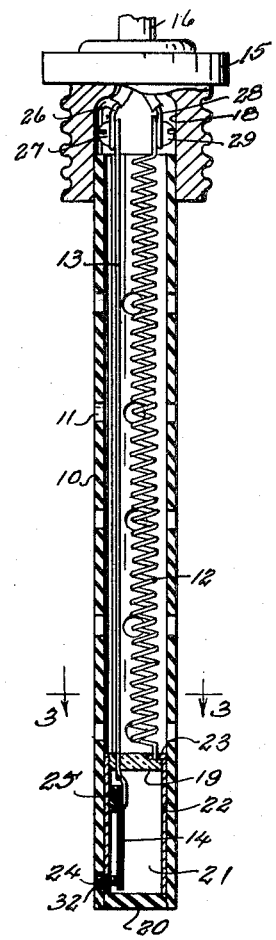
INVENTOR.
Julian A. Blais
BY Victor J. Evans & Co.
ATTORNEYS

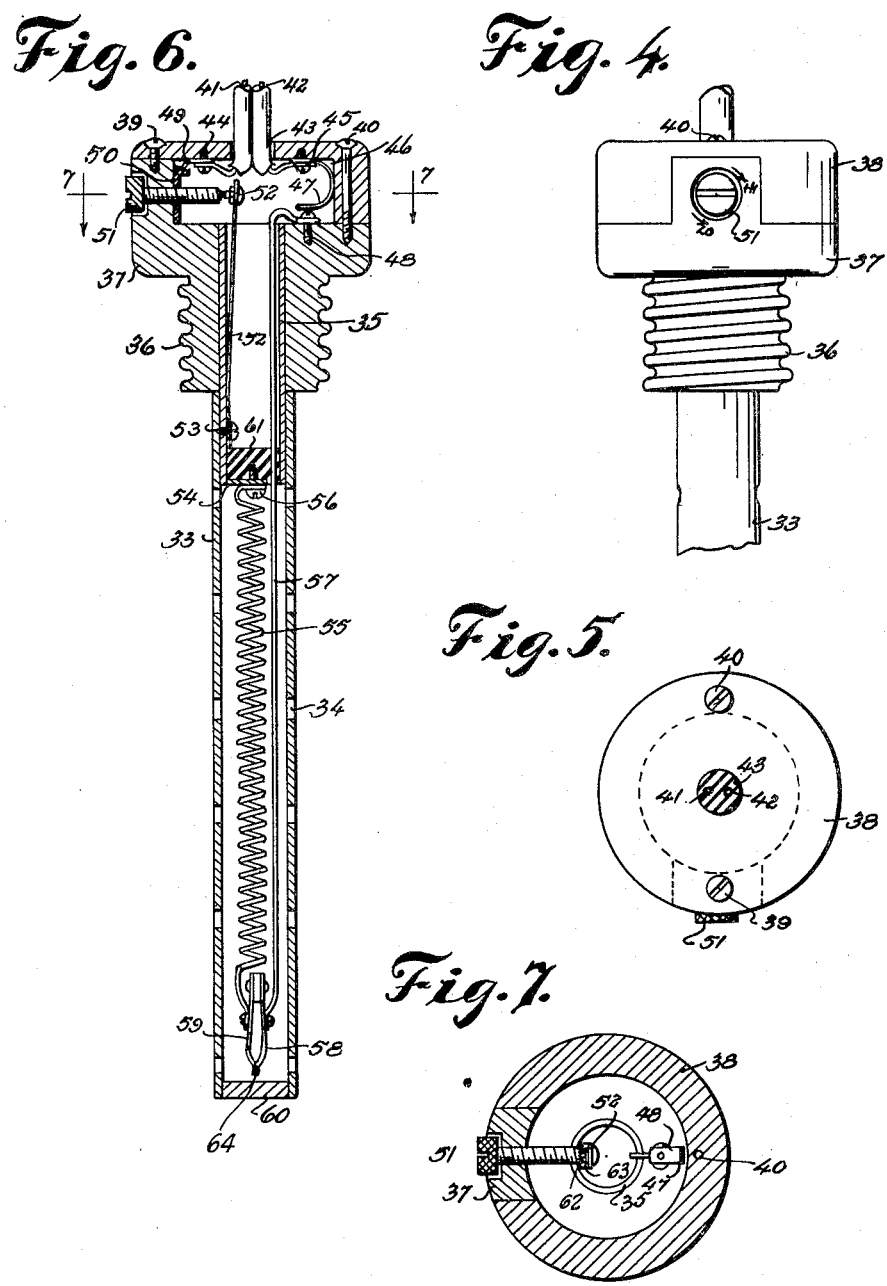

Patented Oct. 5, 1954

2,691,089

UNITED STATES PATENT OFFICE 2,691,089

HOT-WATER BOTTLE HEAT STABILIZER

Julian A. Blais, International Falls, Minn.

Application September 4, 1952, Serial No. 307,766

4 Claims. (Cl. 219—41)

This invention relates to electric heating elements of the type inserted in containers for stabilizing the temperature of fluids therein, and in particular a flexible electric heating element in the form of a coil positioned in a flexible tube extended from a plug adapted to be threaded into the neck of a hot water bottle and a thermostatic element positioned in the extended end of the flexible tube and connected in the circuit of the electric heating element, whereby the temperature of fluid in which the heating element is positioned is controlled.

The purpose of this invention is to provide an electric heating unit that is adapted to be inserted in a hot water bottle or other container whereby temperature of fluids in the container is readily controlled.

In a hot water bottle the heat loss is comparatively rapid and for this reason it is desirable to provide a heating element that will stabilize the temperature of the heater.

The object of this invention is, therefore, to provide means for forming an electric heating element whereby the heating section of the unit is flexible so that it may extend into the body of a rubber hot water bottle or the like.

Another object of the invention is to provide an improved electric heating element for hot water bottles that is adapted to be used in bottles now in use without changing the bottles.

A further object of the invention is to provide a flexible electric heating element for use in rubber hot water bottles in which the element is of a simple and economical construction.

With these and other objects and advantages in view the invention embodies a perforated elongated flexible tube, a threaded plug from which the tube extends, an electric heating element in the form of a wire coil extended partially through the flexible tube, a thermostatic element positioned in the tube, a conductor extended through the tube and spaced from the wire coil, and an electric cord having a plug on the extended end thereof extended from the threaded plug and connected to the coil and conductor, the opposite ends of said coil and conductor being connected to the thermostatic element.

Other features and advantages of the invention will appear from the following description taken in connection with the drawing, wherein:

Figure 1 is a side elevational view illustrating the hot water bottle electric heating element.

Figure 2 is a longitudinal section through the electric heating unit with the upper end of the plug shown in elevation.

Figure 3 is a sectional plan through the unit taken on line 3—3 of Fig. 2.

Figure 4 is an elevational view showing the plug at the upper end of the heat stabilizing device and illustrating a modification wherein the thermostatic element is incorporated in the plug.

Figure 5 is a plan view of the plug shown in Figure 4.

Figure 6 is a vertical section through the plug shown in Figure 4 illustrating the arrangement of the parts.

Figure 7 is a cross section through the head of the plug taken on line 7—7 of Figure 6.

Referring now to the drawing wherein like reference characters denote corresponding parts the improved electric heater of this invention includes a flexible tube 10 having perforations 11 therein, an electric heating element 12 positioned in the tube, a conductor 13 extended through the tube, a bi-metal arm 14 providing a thermostat, a threaded plug 15, designed to be threaded into the neck of a hot water bottle, and an electric cord 16 having a plug 17 on the extended end thereof.

As illustrated in Fig. 2, the plug 15 is provided with a cylindrical bore 18 in the extended end of which the tube 10 is frictionally mounted, and the extended end of the tube is provided with a partition 19 and a closure 20 whereby a compartment 21 is provided in the extended end of the tube.

The compartment 21 in the extended end of the tube 10 is provided with a tubular lining 22 to which one end of the element 12 is connected by means of a tab 23 and the opposite end of the tube is provided with an adjusting screw 24 that is positioned to contact the bi-metal arm or finger 14. The arm 14 is mounted on a base 25 and the conductor 13 extends from the end of the arm 14, through the disc 19, which is of insulating material and through the tube 10 to the bore of the plug 15 in which the conductor is attached to a wire 26 that extends from the cord 16, with a screw 27. The other wire 28 of the cord 16 is attached to the end of the electric heating element 12 by a screw 29.

The wires 26 and 28, which extend through the cord 16 are attached to the conventional prongs 30 and 31, respectively of the plug 17 by means of which the electric heater may be plugged into a wall socket or the like.

With the screw 24 extended through an opening 32 in the tube 10 the device may be set to control the temperature of water in a container in which the device is positioned and with the tube, heating element, and conductor flexible the device may remain permanently in a rubber hot water bottle or the like.

It will also be understood that conventional switches, rheostats, or other circuit controlling devices may be used in the cord 16 or plug 15 as may be desired.

The device of this invention, therefore, is a stabilizer which supplements the heat loss of water in a hot water bottle so that the water may be maintained at constant temperature.

A heater heats, whereas the stabilizer of this invention merely supplies the loss of heat, or maintains a desired temperature only, after the container has been filled with hot water.

There is a definite purpose in keeping the amperage as low as possible and that is a safety feature.

If the container developed a leak or had not been properly filled with water the heat element would not get hot enough to burn or melt the rubber. Also, if the thermostat ceased to operate and remained closed, no ill effects would be suffered, other than the water would get a few degrees hotter than should be.

The electric heating element of this invention also includes a tubular casing 33 having perforations 34 therein and, as illustrated in Figure 6, the casing is secured on the end of a tube 35 extended from a threaded shank 36 of a plug having a head 37. The head 37 is provided with a cap 38 which is secured to the head with screws 39 and 40 and electric supply wires 41 and 42 extended through an opening 43 in the cap are connected to terminals 44 and 45 in a cavity 46 in the cap. The terminal 45 is connected by a spring clip 47 to a terminal 48 and the terminal 44 is connected by a clip 49 to a contact 50 into which a contact screw 51, is threaded as shown in Figure 6.

The inner end of the contact screw 51 is positioned to be engaged by a bi-metal spring 52 connected to a clip 53 of the tube 35 and the clip 53 is connected to a contact 54 to which the upper end of an electric heating element 55 is connected with a screw 56.

The terminal 48 is connected by a wire 57 to contacts 58 and 59 at the opposite end of the electric heating element 55. The lower end of the tube 33 is provided with a plug 60 and a plug 61 of insulating material is provided in the lower end of the tube 35, providing a guide for the wire 57 and mounting means for the upper end of the electric heating element.

With the parts arranged in this manner the contact screw 51 is adapted to be turned by a screwdriver or the like to adjust the position of the inner end thereof whereby the plug is set to provide the temperature desired in the container in which the device is used.

The inner end of the screw 51 is provided with a carbon tip 62 and a similar carbon contact 63 is positioned on the end of the bi-metal member 52, as shown in Fig. 7.

The ends of the spring fingers or contacts 58 and 59 are connected with soft solder 64, or the like, whereby should the temperature exceed a predetermined degree the solder 64 melts and breaks the circuit as shown in Fig. 6.

It will be noted that although the conduit or wire 57 is shown on the outside of the coil 55 it may be extended through the coil.

It will also be understood that other modifications may be made in the design and arrangement of the parts without departing from the spirit of the invention.

What is claimed is:

1. An electric heating unit comprising a threaded plug, a perforated flexible tube extended from said plug, an electric heating element comprising an elongated wire coil extended through said flexible tube, a conductor extended through said tube and spaced from said coil, a tubular lining in the extended end of the flexible tube, a thermostat in said lining one end of which is connected to the coil and the other to the conductor, means mounted in the tubular lining for adjusting the thermostat, and an electric cord extended from the plug and having wires connected to the coil and conductor respectively.

2. An electric heating unit comprising a threaded plug, a perforated flexible tube extended from said plug, an electric heating element comprising an elongated wire coil extended through said flexible tube, a conductor extended through said tube and spaced from said coil, a tubular lining in the extended end of the flexible tube, a thermostat in said lining one end of which is connected to the coil and the other to the conductor, a disc of insulating material in the inner end of the lining in which one end of the conductor is held, means adjusting the thermostat, and an electric cord extended from the plug and having wires connected to the coil and conductor respectively.

3. An electric heating unit comprising a threaded plug, a perforated flexible tube extended from said plug, an electric heating element comprising an elongated wire coil extended through said flexible tube, a conductor extended through said coil, a bimetal element in said unit and positioned with one end connected to said heating element, a carbon contact on said bimetal element, and an adjusting screw in the plug having a carbon tip positioned whereby said carbon tip engages the carbon contact of the bimetal element, and an electric cord extended from said plug and having wires connected to said adjusting screw and conductor respectively.

4. An electric heating unit comprising a threaded plug, a perforated flexible tube extended from said plug, an electric heating element comprising an elongated wire coil extended through said flexible tube, a conductor extended through said coil, spring fingers connecting the conductor to the electric heating element coil, a fusible material connecting said spring fingers, a thermostat in said plug, and an electric cord extended from the plug and having wires connected to the coil and conductor respectively.

References Cited in the file of this patent

UNITED STATES PATENTS

| Number | Name | Date |
|---|---|---|
| 1,086,646 | Christian | Feb. 10, 1914 |
| 1,773,546 | Rider | Aug. 19, 1930 |
| 1,866,221 | Pennington | July 5, 1932 |
| 2,064,248 | Doyon | Dec. 15, 1936 |
| 2,178,397 | Larkey | Oct. 31, 1939 |
| 2,192,655 | Smith | Mar. 5, 1940 |
| 2,223,154 | Thornton-Norris | Nov. 26, 1940 |
| 2,274,383 | Rush | Feb. 24, 1942 |

FOREIGN PATENTS

| Number | Country | Date |
|---|---|---|
| 400,777 | Great Britain | Nov. 2, 1933 |
| 534,451 | Great Britain | Mar. 6, 1941 |